(No Model.)
F. J. SPRAGUE.
REGULATOR FOR ELECTRO DYNAMIC MOTORS.
No. 313,247. Patented Mar. 3, 1885.
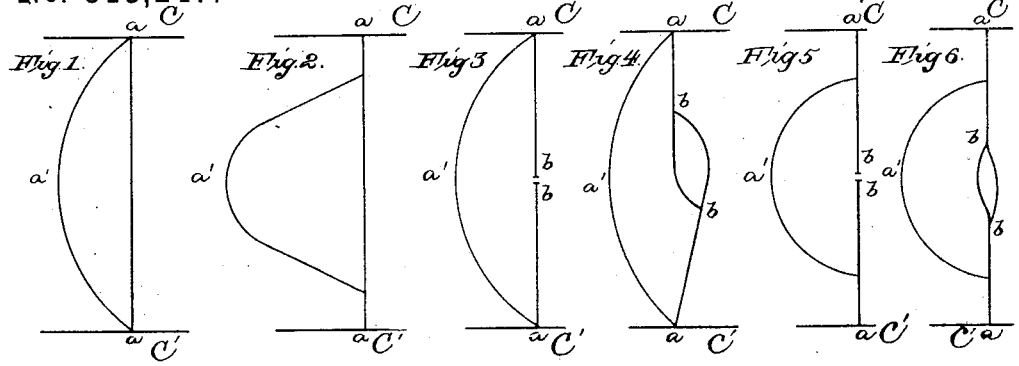
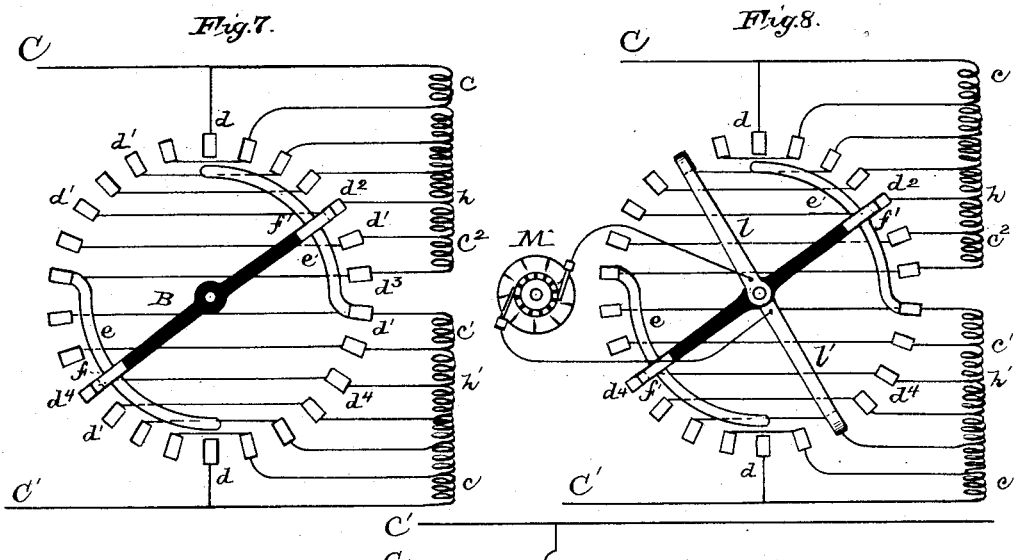
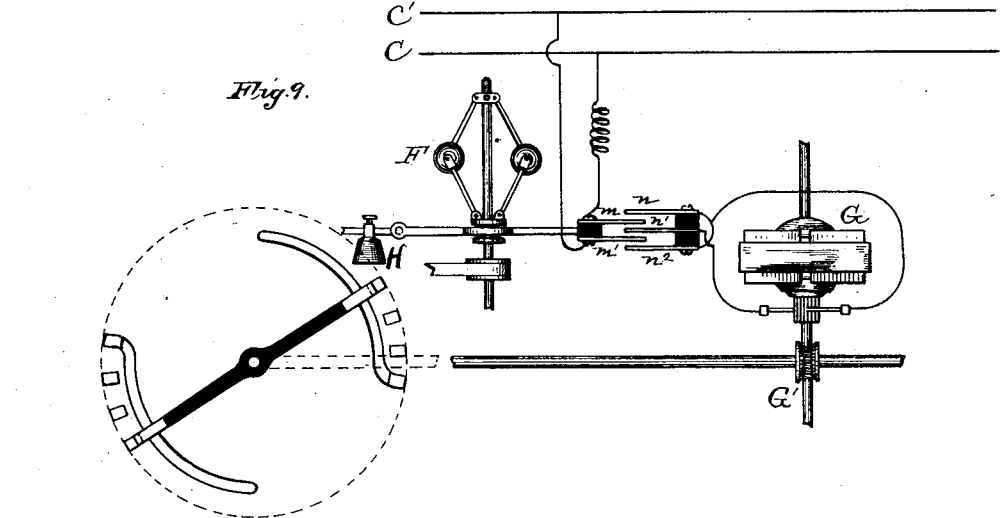
ATTEST:
E. C. Rowland
T. G. Greene
INVENTOR:
Frank J. Sprague
By Dyer & Seely
Attys

UNITED STATES PATENT OFFICE.

FRANK J. SPRAGUE, OF NEW YORK, N. Y.

REGULATOR FOR ELECTRO-DYNAMIC MOTORS.

SPECIFICATION forming part of Letters Patent No. 313,247, dated March 3, 1885.

Application filed February 21, 1884. (No model.)

*To all whom it may concern:*

Be it known that I, FRANK J. SPRAGUE, of New York, in the county and State of New York, have invented a certain new and useful Improvement in Electro-Dynamic Motors, of which the following is a specification.

My invention relates to electro-dynamic motors of that class in which the main field-coils—that is to say, those which determine the polarity of the field, are in shunt relation to the armature; and said invention consists in a new method of regulation for such motors, as hereinafter set forth, whereby the speed or the power of a motor may be varied, or the speed may be maintained constant under varying loads or under varying conditions of the circuit. My method of regulation is therefore adapted to all the different conditions and situations in which such motors may be used, whether they are stationary motors connected with a system of electrical distribution, in which case it is usually desirable to maintain a constant speed under different loads, and usually with a constant potential circuit, or used upon moving vehicles for railway purposes, in which case the speed must necessarily be often changed, and also the power, as for differing grades, and where the initial potential changes on account of the moving of the motor to different parts of the circuit, and from other causes.

The main features of my invention depend upon the following principles: In an electric motor with armature and field-circuits independent, the total power which can be developed and the economy and efficiency of the motor are entirely independent of the strength of the field, but depend, within practical limits, alone upon the initial and counter electro-motive forces and the resistance of the armature, if speed be not limited. The strength of the field determines the speed at which the motor must run to get a required efficiency. With a given initial potential at the armature-terminals, the speed may be maintained constant, no matter how the load varies from the maximum allowed, by changing the strength of the field, such strength being diminished as the load is increased, and, vice versa, increased as the load is diminished. These principles, which I believe to be original with me, may be demonstrated as follows: Consider the motor-current as derived from mains having a fixed difference of potential, and the motor with its field and armature in shunt relation. In this case the armature runs with a velocity dependent upon the strength of field, the initial potential, the number of turns, resistance, &c., of the armature, and the load, and a counter electro-motive force is set up which diminishes the armature-current. The higher the speed the greater this counter electro-motive force. Let E be the initial and $e$ the counter electro-motive force, and $r$ the resistance of the armature. The current flowing in the armature is then $\frac{E-e}{r}$. With a given armature and given field, $e$ varies with the speed. Now, the power at any given speed and strength of field varies with the current, and with any given current varies with the strength of field. The total work done is the product of the speed by the work per turn, and since the speed is as $e$ and the work per turn as the current $\left(\frac{E-e}{r}\right)$, the total work done is expressed by $\frac{e(E-e)}{r}$. The efficiency is the ratio $\frac{e}{E}$. It will be seen that both these expressions—the total work done and the efficiency—are independent of any function of the field, but depend only on the initial and counter electro-motive forces and the resistance of the armature, and any given value of $e$ can be attained with any strength of field by attaining proper speed. Suppose the motor doing a certain amount of work at a certain speed. If $e = \frac{E}{2}$, armature-current is $\frac{E}{2r}$ and work done $\frac{E^2}{4r}$. Now, let the speed be increased one-half by diminishing the mechanical work per turn, the field remaining the same. $e$ now equals $\frac{3}{4}E$, current is $\frac{E}{4r}$, and work done $\frac{3E^2}{16r}$, which is less than before with same field. Let the original field be strengthened one-half, the speed remaining the same. The counter electro-motive force, current, and work done are the same as in last case. Suppose, now, that this last field be decreased one-ninth and the speed increased one-seventh. $e$ now equals $\frac{7E}{12}$, current is $\frac{5E}{12r}$, and work done $\frac{35E^2}{144r}$, more than in last case, although with weaker field. Or we may consider the speed of machine constant, its field alone being varied. Differentiating the expression for work done, $\frac{e(E-e)}{r}$, we have $\frac{de}{r}\left(E-2e\right)$ as the rate of variation of work with variations of $e$—that is, of strength of field. It will be noticed, however, that this expression has a positive value only when $e$ is greater than $\frac{E}{2}$, if $de$ is negative—that is, if the field is weakened. In other words, this law of increased work with decreased field is true only when working above fifty per cent. efficiency, this efficiency being represented by $\frac{e}{E}$. If working with $e$ less than $\frac{E}{2}$, the field must be strengthened to increase the work done; but, except in starting a motor, this is the worst possible condition for working a machine, and hence is uneconomical and every way objectionable.

In carrying my invention into effect I weaken the field by decreasing the magnetizing effect of the field-magnet coils to produce an increase of the mechanical effects—that is, of the speed or power, or both, of the motor—and I strengthen the field by increasing the magnetizing effect of its coils to decrease the said mechanical effects.

While in the above mathematical demonstration I have, for convenience, considered the motor as in circuit with mains having a constant difference of potential—as if, for instance, it were connected with a multiple-arc system of electrical distribution—it will be evident that the same method is applicable to the regulation of the motor under changes of potential in the circuit, for if an increased difference of potential occurs the field is strengthened to counteract it, and for a decreased difference of potential the field is correspondingly weakened.

In all the different conditions and uses, as I have already stated, I vary the magnetizing effect of the field-coils to vary mechanical effects in the motor. The different conditions and purposes for which I make use of this method are as follows:

To change the speed or power of a motor on a circuit of constant potential, the speed or power is increased by weakening the field, which produces a decreased counter electro-motive force and an increased armature-current, and consequently the increased mechanical effect desired, and such mechanical effect is decreased by strengthening the field, and thus increasing the counter electro-motive force.

To maintain the speed constant with a current of constant potential under varying loads, when the load increases so that the speed would naturally decline, the field is weakened, the counter electro-motive force diminished and armature-current increased, the tendency to reduced speed is counteracted, and there is an increase in the mechanical effect—power. For a decreased load the field is strengthened, the counter electro motive force increases, the current decreases, the speed remains the same, and the power is decreased.

To maintain speed or power constant under varying initial potential, if the potential at the motor terminals increases, these mechanical effects increase or tend to increase. By strengthening the field I produce an increased counter electro-motive force, so that the increased power or speed, or the tendency thereto, is counteracted, and this counteracting may evidently be itself considered a decrease in mechanical effect, whether the regulation is performed simultaneously with the increase of potential or before or after such increase. If the regulation is performed simultaneously, with a gradual change of potential, there may be less change in counter electro-motive force or armature-current; but there is still the counteracting of the tendency to increased mechanical effect, which counteracting is, as I have just said, itself a decrease of mechanical effect. For a decreased or decreasing initial potential, the field is weakened to counteract the decrease in mechanical effect which would otherwise occur, and therefore to produce an increased mechanical effect.

In any of the above cases I may, at the same time that I vary the magnetizing effect of the field-magnet coils, vary also the armature-current, whereby an additional effect is produced. In my Patent No. 295,454, dated March 18, 1884, is set forth a method of varying the field of a motor by the use of adjustable independent field-coils. This is shown in connection with means for varying the relation between the number of field-coils in series and those in shunt relation with the armature to vary the armature-current.

I have devised another and a preferable mode of field regulation by varying the magnetizing effect of the field-coils, which also may be used in connection with the above-mentioned armature regulation; and this, while especially adapted for motors, is also applicable to the regulation of the field-magnets of dynamo-electric generators. According to this method I wind the field-coils in two sets or ranges, each connected with the supplying-circuit at one end, and having the other end free. By connecting the free end of each range to different points of the opposite range, more or less of the coils are placed in parallel circuit with each other, and the resistance of the field, and consequently the current and magnetizing effect of the field-coils, are varied. If the armature is in shunt relation with a part of the field-coils, as in the patent referred to, this also incidentally affects the armature-circuit. The same commutator may be employed for varying the field and for varying the armature-current in the manner set forth in the patent referred to.

The field regulation or both field and armature regulation may be accomplished automatically by devices controlled by variations in the speed of the motor. Thus a constant speed is maintained.

The figures of the accompanying drawings are diagrams illustrative of the principles and features of my invention, and I will describe the same in detail.

Figures 1 and 2 represent the arrangement set forth in the patent referred to. C C' are main conductors. $a\ a$ is the field-circuit, and $a\ a'\ a$ the armature shunt. In Fig. 2 the armature is shunted around a less number of field-coils, the difference of potential at its circuit-terminals is lessened, and it receives less current, and the speed or power is diminished; but by my new method I may accomplish this regulation without changing the armature-terminals. This is illustrated in Figs. 3 and 4. The field-coils are broken at terminals $p\ p$, and by a suitable commutator, which will be presently described, greater or less portions of the coils are progressively thrown into multiple arc with each other, to decrease the resistance, strengthen the field, and diminish the speed, and progressively removed from such relation to produce a contrary effect. In this arrangement the armature-terminals are considered as fixed.

Figs. 5 and 6 show the same arrangement of field with the armature capable of being shunted around a greater or less number of the field-coils, illustrating the fact that the present mode of regulation may be used in connection with that set forth in the patent referred to. Incidentally this regulation of the field has an increased effect by the increase or diminution of the armature-current, due to the increase or diminution of the resistance around which it is shunted; but by using the field and armature regulation together an enormous effect may be produced on the speed of the armature. By a very slight change the "racing" of the armature, even if the whole load is suddenly thrown off, is prevented. However, the regulation of the field alone gives complete control of the motor for all practical purposes.

Fig. 7 illustrates the commutator and connections employed with the new method of regulating the field. C C' are the main conductors, and $c\ c'\ c^2$, &c., are sections of field-coils. The commutator is composed of a circle of metal blocks, $d\ d\ d'\ d'$, &c., two of which are extended into the arcs $e$ and $e'$. The connections from the field-sections are made, the first and last to single and opposite blocks $d$ of the commutator, and each of the others to two blocks, $d'\ d^2$ and $d^3\ d^4$. The pivoted commutator-arm consists of an insulating central portion, B, and metal extensions $f\ f'$. These ends each bear on one of the arcs and upon the range of contacts. The field-current from C passes to $h$, where (in the present position of the arm) it divides, part passing to contact $d^2$, extension $f'$, arc $e'$, and coils $c'$, to the reuniting-point $h'$. The rest passes through coils $c^2$ to contacts $d^3$, arc $e$, extension $f$, and contacts $d^4\ d^4$, to $h'$. It will be seen that coils $c'$ and $c^2$ are thus placed in multiple arc to each other. By moving the commutator-arm in one direction or the other, more or less of the sections of field-coils in which the magnet is wound are multiple-arced upon each other, the magnetizing effect of such coils is varied, and the strength of the magnet is increased or diminished. Fig. 8 shows this arrangement in connection with that for changing the relation between the sections of field-coils in series and those in shunt relation to the armature set forth in the patent referred to. Here the additional arms $l\ l'$, insulated from each other, bearing on the contact-blocks, and passing under the arm B, are employed. The terminals of the armature M are connected, respectively, with these arms. As the arms $l\ l'$ are moved the armature is shunted around a greater or less number of the field-coils, remaining in series with the remainder. The arms B and $l\ l'$ may work simultaneously, if desired.

By the use of the commutator shown in Fig. 8, the armature-current or the strength of the field, or both, may be regulated, the circuits never being broken, no adjustable resistances being employed, and all the field-coils being constantly in circuit, while their magnetizing effect is varied.

Fig. 9 illustrates an automatic arrangement which may be employed for moving the arm B to maintain a constant speed. A centrifugal governor, F, is connected with the motor-shaft, so as to be affected by variations in speed. Its moving collar carries two contact-arms, $m\ m'$, insulated from each other, and connected, respectively, with the conductors C C'. These arms enter between the three arms $n\ n'\ n^2$, which also are insulated from one another.

G is a small electric motor, one of whose terminals is connected with the two arms $n\ n^2$, the other with arm $n'$. The motor-shaft is connected by a worm-gearing or other slowing-down gearing with the arm B. The connecting-spindle is, for convenience of illustration, broken off and laid out in dotted lines. An adjustable weight, H, is employed, so that the governor can be set to hold the contact-arms centrally at the normal speed of the motor, to be regulated for its proper efficiency. Should a variation in the load cause the speed to slightly decrease, the governor-balls fall and the arms make their lower contacts, closing circuits to motor G, and causing it to revolve in a direction to shift the arm B, to decrease the field strength, and so keep the speed at its normal point. When, on the contrary, the speed slightly increases, circuit is closed to the motor G in the opposite direction, and the movement of the arm B causes an increase in the field strength, which keeps the speed still at the normal.

As has been already explained, the same mode of regulation is applied to change the power or speed of the motor with a constant current or to maintain speed or power constant in a varying potential circuit.

The particular mode of regulation herein described and the apparatus used therein are not claimed herein, as they will form the subject of a separate application, and I do not limit myself thereto.

The present application relates only to the method of regulation by varying the magnetizing effect of the field-coils—that is, in any way by which the magnet-coils or the current energizing the magnet is affected.

What I claim is—

1. The method of regulation for an electro-dynamic motor whose main field-coils are in shunt relation to its armature, which consists in strengthening the magnetizing effect of the field-magnet coils of the motor to decrease the mechanical effects, as speed or power, or both, and, vice versa, weakening such magnetizing effect to increase the said mechanical effects, substantially as set forth.

2. The method of maintaining constant under varying loads the speed of an electro-dynamic motor whose main field-coils are in shunt relation to its armature, which consists in strengthening the magnetizing effect of the field-magnet coils as the load is diminished, and, vice versa, weakening the said magnetizing effect as the load is increased, substantially as set forth.

This specification signed and witnessed this 12th day of February, 1884.

FRANK J. SPRAGUE.

Witnesses:
H. W. SEELY,
T. G. GREENE.